United States Patent
Fujiwara

(10) Patent No.: US 9,443,325 B2
(45) Date of Patent: Sep. 13, 2016

(54) IMAGE PROCESSING APPARATUS, IMAGE PROCESSING METHOD, AND COMPUTER PROGRAM

(71) Applicant: SONY CORPORATION, Tokyo (JP)

(72) Inventor: Tatsuo Fujiwara, Tokyo (JP)

(73) Assignee: Sony Corporation, Tokyo (JP)

(*) Notice: Subject to any disclaimer, the term of this patent is extended or adjusted under 35 U.S.C. 154(b) by 310 days.

(21) Appl. No.: 13/851,454

(22) Filed: Mar. 27, 2013

(65) Prior Publication Data

US 2013/0314437 A1  Nov. 28, 2013

(30) Foreign Application Priority Data

May 22, 2012  (JP) .................................. 2012-116366

(51) Int. Cl.
- *G06T 11/00* (2006.01)
- *G06K 9/00* (2006.01)
- *G06K 9/62* (2006.01)

(52) U.S. Cl.
CPC ........... *G06T 11/00* (2013.01); *G06K 9/00248* (2013.01); *G06K 9/621* (2013.01)

(58) Field of Classification Search
CPC ............... G06K 9/00221; G06T 2207/20121; G06T 2207/20124; G06T 2207/30201; G06T 2207/30204
See application file for complete search history.

(56) References Cited

U.S. PATENT DOCUMENTS

| 8,649,555 B1 * | 2/2014 | Bregler et al. ................ 382/103 |
| 2010/0202696 A1 * | 8/2010 | Usui ..................... G06T 7/0046 382/190 |
| 2012/0177288 A1 * | 7/2012 | Chaussat et al. ............. 382/165 |

FOREIGN PATENT DOCUMENTS

| JP | 2010-244318 | 10/2010 |
| JP | 2010-244321 | 10/2010 |

OTHER PUBLICATIONS

Cootes et al., Active Shape Models—'Smart Snakes,' British Machine Vision Conference 1992, Sep. 22-24, 1992, p. 266-275, Springer London.
Cootes et al., Active Appearance Models, 5th European Conference on Computer Vision, Jun. 2-6, 1998, p. 484-498, Springer Berlin Heidelberg.

* cited by examiner

*Primary Examiner* — Antonio A Caschera
(74) *Attorney, Agent, or Firm* — Paratus Law Group, PLLC

(57) ABSTRACT

There is provided an image processing apparatus including a model information acquisition section which acquires model information in which a plurality of shape information pieces acquired in advance are resolved into basis spaces, a deviation region detection section which detects a deviation region in a shape of a target object in an inputted image, the deviation region having a difference from the model information, and a projection section which projects the shape of the target object in the inputted image onto the basis spaces after masking the deviation region.

13 Claims, 15 Drawing Sheets

100 IMAGE PROCESSING APPARATUS

FIG. 3
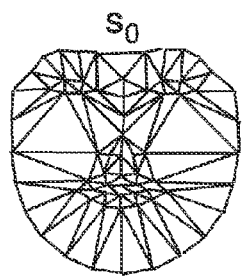
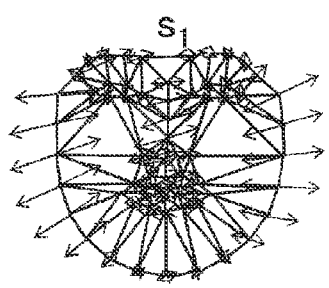
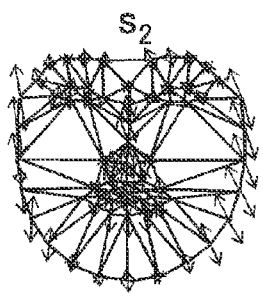
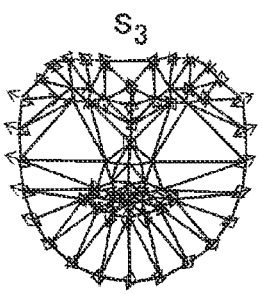

FIG. 10
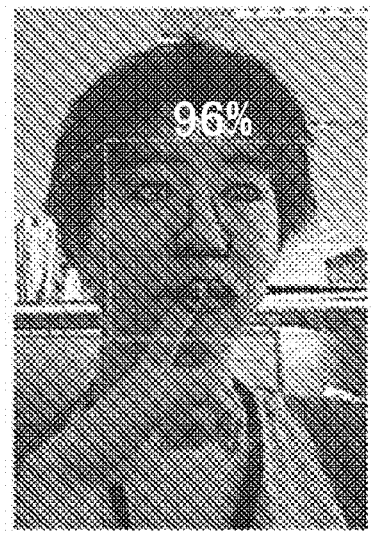
(A)
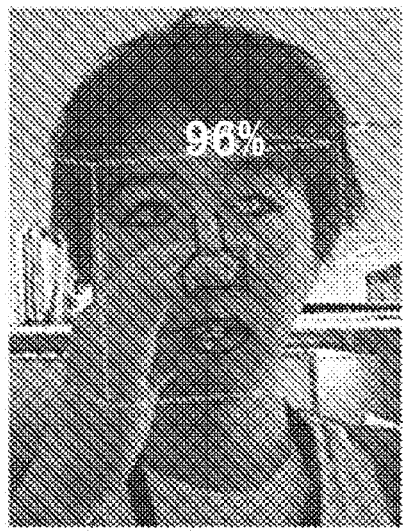
(B)
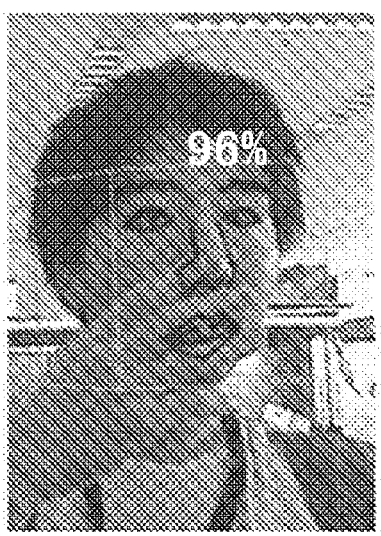
(C)
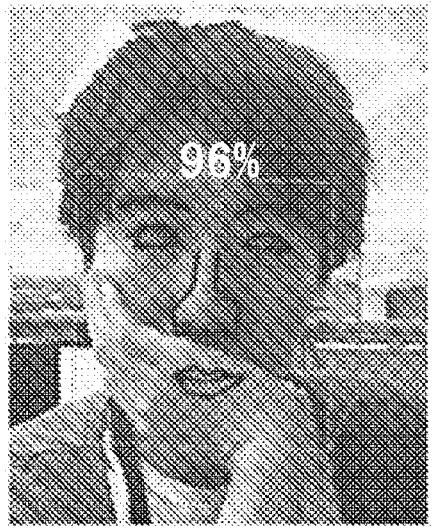
(D)

FIG. 12
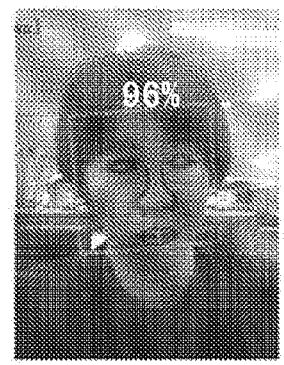
(A)
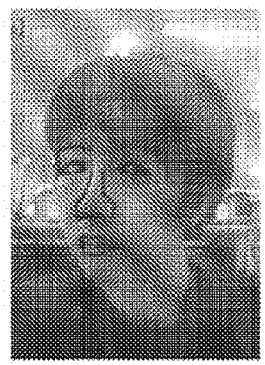
(B)
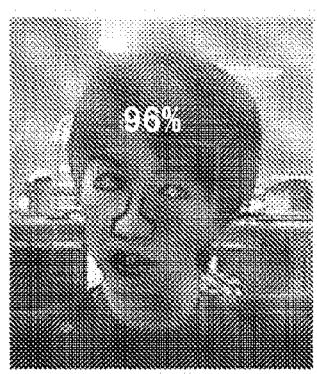
(C)
(D)
(E)

FIG. 15
(A) FACING FRONT
(B) FACING FRONT WITH MOUSE OPENED
(C) FACING FRONT WITH ONE EYE CLOSED
(D) FACING SIDEWAYS
(E) FACING SIDEWAYS WITH MOUSE OPENED
(F) FACING UPWARD
(G) FACING DOWNWARD

IMAGE PROCESSING APPARATUS, IMAGE PROCESSING METHOD, AND COMPUTER PROGRAM

BACKGROUND

The present disclosure relates to an image processing apparatus, an image processing method, and a computer program by which an object shape including a deformed part in an inputted image is recognized and estimated, and particularly relates to an image processing apparatus, an image processing method, and a computer program by which a plurality of shape information pieces acquired in advance are resolved into basis spaces, and any one of shapes of objects included in an inputted image is recognized and estimated by performing projection and back projection onto the basis spaces.

An "Active Shape Model (ASM)" and an "Active Appearance Model (AAM)" are known as a technique of modeling a visual event. These techniques use preliminary learning performed in such a manner that, through a statistical analysis such as a principal component analysis (PCA) or an independent component analysis (ICA), a plurality of given shape information pieces (positions (coordinates) of a plurality of feature points defined in a face image, pixel values (such as brightness values) or the like) are resolved into (projected onto) a plurality of basis spaces and are registered (for example, see: T. F. Cootes and C. J. Taylor, "Active shape models", In D. Hogg and R. Boyle, editors, 3rd British Machine Vision Conference, pages 266-275, Springer-Verlag, September 1992; and T. F. Cootes, G. J. Edwards, and C. J. Taylor, "Active Appearance Models", in Proc. European Conference on Computer Vision 1998 (H. Burkhardt & Neumann Ed. s). Vol. 2, pp. 484-498, Springer, 1998). In addition, the techniques make it possible to represent a certain shape by combining (performing back projection on) the registered basis spaces and thus to recognize and estimate a shape of an object including a deformed part such as a face. Moreover, the ASM/AAM make it possible to represent the face in a deformed manner, for example, the face orientation of a person is changed, or the degree of opening of any of the eyes or the mouse is changing.

For example, there is proposed an image processing apparatus which sets a shape model and a texture model by using an AAM in the following manner. A specific feature model showing a specific feature of a face texture is set independently, and a correction texture model is set for textures other than the specific feature. Then, the specific feature model and the corrected texture modes are combined with each other to thereby set the texture model with high accuracy and efficiency (for example, see JP 2010-244321A).

There is also proposed an image processing apparatus which locates a feature part of a face included in an image by using the AAM in the following manner. A texture correction is applied to at least one of a reference face image and a target face image so that face textures of the reference face image and target face image are made close to each other, and then feature part reliability is calculated based on the reference face image and the target face image one of which has undergone the texture correction (for example, see JP 2010-244318A).

The ASM/AAM has an advantage that repeating the projection and the back projection of any shape distribution leads to an output close to a shape registered in advance, that is, a shaped output. In addition, the ASM/AAM make it possible to lightly and quickly implement processing of tracking or fitting of a chief feature part (a face part) from a face region included in an inputted image.

However, the method such as the ASM/AAM by which a plurality of shape information pieces acquired in advance are resolved into basis spaces, and a certain shape is represented by combining the basis spaces has the following disadvantages.

(1) When a part of a shape (feature points) of a target object in an inputted image lies at a position largely deviating from an original position, an entire shape of the object is influenced by the deviation value and is displaced.

(2) When positions of a shape (feature points) are estimated by using a local feature quantity in an image, it is difficult to locate a region poor in features such as an edge or a texture.

SUMMARY

It is desirable to provide an image processing apparatus, an image processing method, and a computer program which are excellent and capable of, even though a part of a shape included in an imputed image lies at a position largely deviating from an original position, accurately recognizing and estimating the shape by combining basis spaces acquired in advance from a plurality of shape information pieces, without being influenced by the deviation point.

It is further desirable to provide an image processing apparatus, an image processing method, and a computer program which are excellent and capable of accurately recognizing and estimating even a shape including a region poor in features by combining basis spaces acquired in advance from a plurality of shape information pieces.

According to an embodiment of the present technology, there is provided an image processing apparatus including a model information acquisition section which acquires model information in which a plurality of shape information pieces acquired in advance are resolved into basis spaces, a deviation region detection section which detects a deviation region in a shape of a target object in an inputted image, the deviation region having a difference from the model information, and a projection section which projects the shape of the target object in the inputted image onto the basis spaces after masking the deviation region.

According to an embodiment of the present technology, the basis spaces, may include a mean shape and basis components of the plurality of shape information pieces acquired in advance, and the deviation region detection section may detect a deviation region in the shape of the target object in the inputted image, the deviation region having a difference from the mean shape.

According to an embodiment of the present technology, the model information may include a shape model in which shape information pieces are resolved into basis spaces and a texture model, the shape information pieces being related to coordinate positions of a plurality of feature points defined in the shape of the target object, the texture model being related to texture information of each of the feature points. The image processing apparatus may further include a texture model matching processing section which searches for a position of each feature point in the inputted image based on calculation of a cost which is a difference of the texture information between the inputted image and the texture model, and the deviation region detection section may judge, as a deviation point, any of the feature points having a cost equal to or higher than a predetermined threshold, the cost being calculated by the texture model matching processing section.

According to an embodiment of the present technology, there is provided an image processing apparatus including a model information acquisition section which acquires model information in which a plurality of shape information pieces acquired in advance are resolved into basis spaces, a deviation region detection section which detects a deviation region designated in advance in a shape of a target object in an inputted image, and a projection section which projects the shape of the target object in the inputted image onto the basis spaces after masking the deviation region.

According to an embodiment of the present technology, the model information may include a shape model in which shape information pieces are resolved into basis spaces and a texture model, the shape information pieces being related to coordinate positions of a plurality of feature points defined in the shape of the target object, the texture model being related to texture information of each of the feature points. Any of the feature points poor in the texture information may be designated in advance as a deviation point.

According to an embodiment of the present technology, the image processing apparatus may further include a texture model matching processing section which searches for a position of each feature point in the inputted image based on calculation of a cost which is a difference between the inputted image and the texture information of the texture model. The texture model matching processing section may omit processing for the feature point designated in advance as the deviation point.

According to an embodiment of the present technology, the model information acquisition section may acquire, as the model information, the basis spaces into which the plurality of shape information pieces acquired in advance are resolved by a principal component analysis or an independent component analysis.

According to an embodiment of the present technology, there is provided an image processing method including acquiring model information in which a plurality of shape information pieces acquired in advance are resolved into basis spaces, detecting a deviation region in a shape of a target object in an inputted image, the deviation region having a difference from the model information, and projecting the shape of the target object in the inputted image onto the basis spaces after masking the deviation region.

According to an embodiment of the present technology, there is provided an image processing method including acquiring model information in which a plurality of shape information pieces acquired in advance are resolved into basis spaces, detecting a deviation region designated in advance in a shape of a target object in an inputted image, and projecting the shape of the target object in the inputted image onto the basis spaces after masking the deviation region.

According to an embodiment of the present technology, an image processing apparatus including an image input section which inputs an image including a target object, a deviation region detection section which detects a deviation region in a shape of the target object in an inputted image, the deviation region having a difference from model information in which a plurality of shape information pieces acquired in advance are resolved into basis spaces, a processing requesting section which transmits information on the detected deviation region to a server and requests the server for processing of estimating the shape of the target object in the inputted image by projecting the shape onto the basis spaces, and a processing result receiving section which receives a result of estimating the shape of the target object in the inputted image from the server, the result being obtained by projecting the shape onto the basis spaces after masking the deviation region in the shape.

According to an embodiment of the present technology, there is provided an image processing apparatus including an image input section which inputs an image including a target object, a processing requesting section which transmits information on a deviation region designated in advance to a server and requests the server for processing of estimating a shape of the target object in an inputted image by projecting the shape onto basis spaces into which a plurality of shape information pieces acquired in advance are resolved, and a processing result receiving section which receives a result of estimating the shape of the target object in the inputted image from the server, the result being obtained by projecting the shape onto the basis spaces after masking the deviation region in the shape.

According to an embodiment of the present technology, there is provided a computer program described in a computer-readable format to cause a computer to function as a model information acquisition section which acquires model information in which a plurality of shape information pieces acquired in advance are resolved into basis spaces, a deviation region detection section which detects a deviation region in a shape of a target object in an inputted image, the deviation region having a difference from the model information, and a projection section which projects the shape of the target object in the inputted image onto the basis spaces after masking the deviation region.

According to an embodiment of the present technology, there is provided a computer program described in a computer-readable format to cause a computer to function as a model information acquisition section which acquires model information in which a plurality of shape information pieces acquired in advance are resolved into basis spaces, a deviation region detection section which detects a deviation region designated in advance in a shape of a target object in an inputted image, and a projection section which projects the shape of the target object in the inputted image onto the basis spaces after masking the deviation region.

The computer programs according to embodiments of the present technology are computer programs described in the computer-readable format so that predetermined processing can be implemented on the computer. To put it differently, by installing any of the computer programs according to the embodiments on the computer, a cooperative action is exerted on the computer, and the same operations and effects as those of the aforementioned image processing apparatuses according to the embodiments can be obtained.

According to the technology disclosed herein, there are provided an image processing apparatus, an image processing method, and a computer program which are excellent and capable of accurately recognizing and estimating a shape included in the inputted image in such a manner that a phenomenon in which a shape deviates due to an influence of a covering object, lighting or a shadow is eliminated by performing the projection onto the basis spaces after masking the region largely deviating from the original position in the shape.

In addition, according to the technology disclosed herein, there are provided an image processing apparatus, an image processing method, and a computer program which are excellent and capable of, even though a shape included in an inputted image includes a region poor in features, accurately recognizing and estimating the shape by performing the projection onto the basis spaces after masking the region.

Other needs, characteristics, and advantages of the technology disclosed herein will become apparent in more detailed descriptions based on embodiment to be described later and the appended drawings.

BRIEF DESCRIPTION OF THE DRAWINGS

FIG. 3 is a diagram illustrating a mean vector $s_0$ and shape vectors $s_1, s_2, \ldots$ acquired by performing a principal component analysis on coordinate vectors of a plurality of learning coordinates;

FIG. 10 shows images illustrating results of the recognition and estimation processing shown in FIG. 9 performed on inputted images including shapes of the face turned in various directions, changing expressions, and partially covered with the hand;

FIG. 12 shows images illustrating results of the recognition and estimation processing shown in FIG. 11 performed on inputted images including shapes of the face turned in various directions and changing expressions;

FIG. 15 shows images illustrating learning images of a person which are taken with the face turned in various directions.

DETAILED DESCRIPTION OF THE EMBODIMENTS

Hereinafter, preferred embodiments of the present disclosure will be described in detail with reference to the appended drawings.

Figure 1:
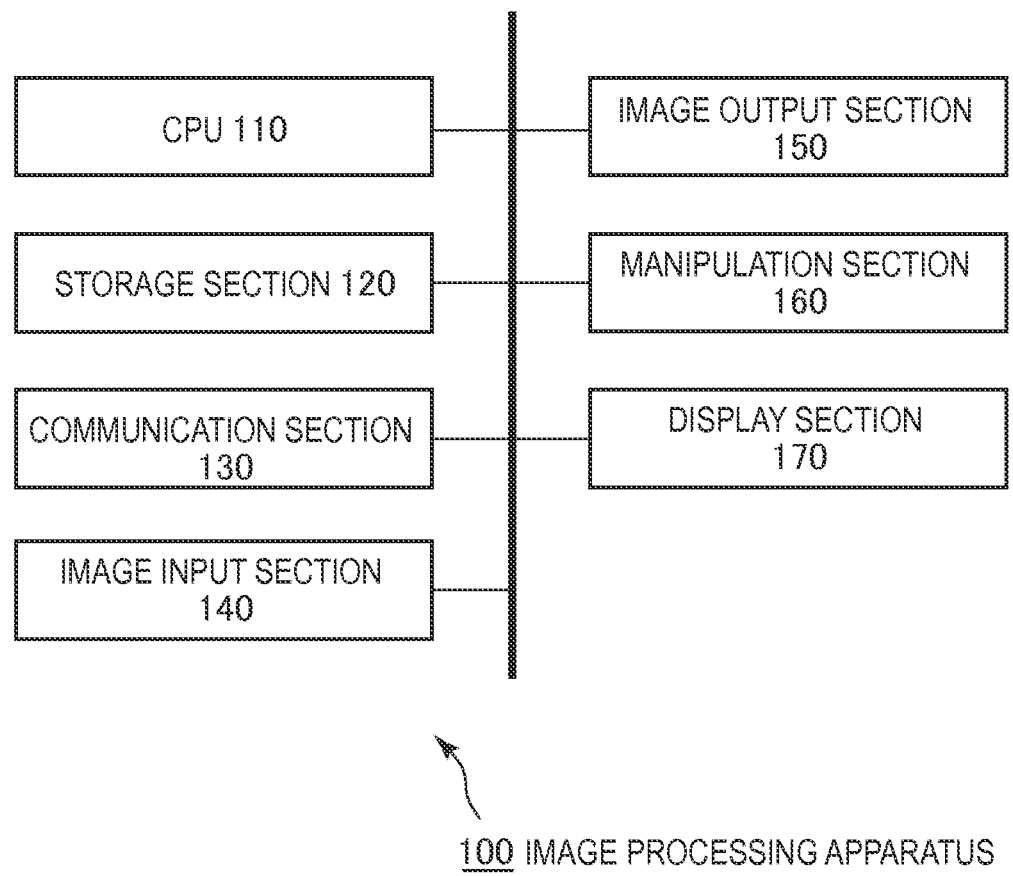
FIG. 1 is a diagram schematically showing a hardware configuration of an image processing apparatus 100 to which an embodiment of a technology disclosed herein is applicable.

FIG. 1 schematically shows a hardware configuration of an image processing apparatus 100 to which an embodiment of a technology disclosed herein is applicable. The image processing apparatus 100 illustrated therein includes a CPU (Central Processing Unit) 110, a storage section 120, a communication section 130, an image input section 140, an image output section 150, a manipulation section 160, and a display section 170.

The CPU 110 controls operations of the sections in the image processing apparatus 100 by executing various program codes as well as an image processing program.

The storage section 120 is based on a concept that a storage section includes internal memories such as a RAM (Random Access Memory) and a ROM (Read On Memory), a large volume storage device such as a hard disk drive, further a DVD (Digital Versatile Disc) recording and reproducing apparatus, and the like. The large volume storage device stores an operating system, program codes such as an image processing program executed by the CPU 110, and files of various data as well as preliminary learning data used in image recognition. The CPU 110 executes the program codes in the large volume storage device by loading the program codes onto RAM.

The communication section 130 is formed by a network interface and the like, and is used in performing: download of various application programs as well as the image processing program, and files of the preliminary learning data and other data; upload of the preliminary learning data acquired by the image processing apparatus 100 or transfer thereof to a networking device; upload of an execution result of image processing (for example, a result of recognizing an inputted image) or transfer to a networking device; and the like.

The image input section 140 is formed by a camera or a scanner, and is used in inputting an image which is a target of the image processing (such as recognition and estimation of a shape of an object. However, a processing target image might be acquired from another apparatus on a network through the communication section 130.

The image output section 150 is formed by a printer or the like, and performs recording of an image inputted from the image input section 140 on paper or another medium, printing of an image recognition result, or the like. However, the image output section 150 does not necessarily have to be provided for the image processing (the recognition and estimation of an object shape, and the like) to be described later.

The manipulation section 160 is formed by handlers enabling user manipulation, such as a keyboard, a mouse, buttons, and a touch panel, and is used in instructing for start of any of the various applications as well as the image processing program, manually inputting data in the preliminary learning (such as setting feature points on a learning image), and performing other setting processing.

The display section 170 is formed by a liquid crystal display or the like, and is used for displaying an image inputted from the image input section 140, displaying a result of the image recognition processing performed on the inputted image (including data learned in advance, data processed halfway, the recognition and estimation result of the inputted image), and the like.

The image processing apparatus 100 shown in FIG. 1 corresponds to, for example, a personal computer, a mobile phone, a multifunctional terminal such as a smartphone or a tablet, or a device such as a printer. The image processing apparatus 100 performs processing such as the recognition and estimation of an object shape in such a manner that the CPU 110 executes a program. However, instead of performing all of the recognition and estimation processing by the image processing apparatus 100 by itself, the image processing apparatus 100 in some cases requests another apparatus (such as a server) on the network to perform part or all of the recognition and estimation processing and performs only part of the recognition and estimation processing such as displaying the inputted image or a processing result.

In the image processing apparatus 100 according to the present embodiment, the CPU 110 executes a predetermined image processing program. Thereby, a plurality of shape information pieces are resolved into basis spaces, the projection and the back projection onto the basis spaces are performed for a certain inputted shape to perform the recognition and estimation processing on a shape of an object including a deformed part. As mentioned above, the ASM and the AAM are known as this type of technique and have a feature that certain shape distribution is shaped by performing the projection and the back projection on the basis spaces to thereby obtain an output close to a shape registered in advance. Hereinbelow, a description is given by taking a human face image as an example of an object shape including a deformed part.

Figure 2:
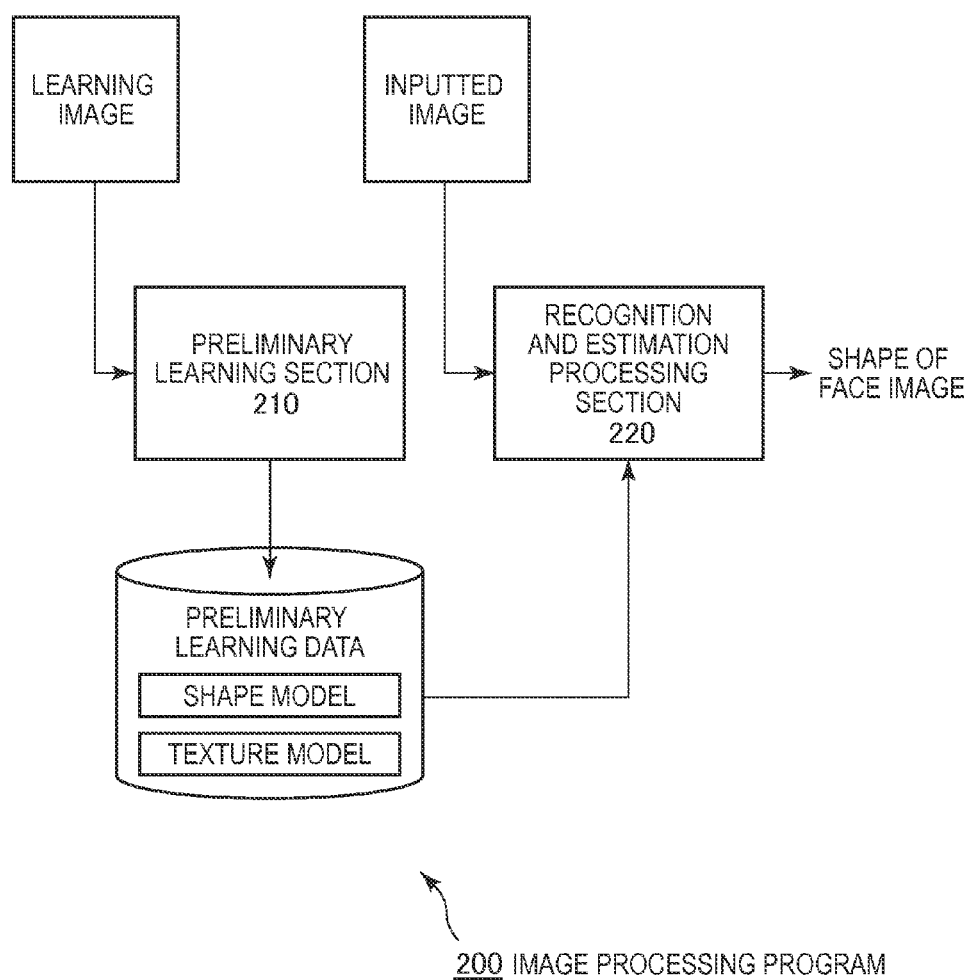
FIG. 2 is a diagram schematically showing a functional configuration of an image processing program executed on the image processing apparatus 100.

FIG. 2 schematically shows a functional configuration of an image processing program 200 for implementing such processing. The image processing program 200 illustrated therein includes a preliminary learning section 210 which performs preliminary learning and a recognition and estimation processing section 220 which performs the recognition and estimation processing based on the preliminary learning on a face image included in an inputted image.

The preliminary learning section 210 receives a large number of learning images for the preliminary learning. The learning images are not only inputted from the image input section 140, but also acquired from the outside through the communication section 130 in some cases, and are further read from a disk reproducing apparatus serving as the storage section 120.

Face images are prepared as the learning images to include assumed various attributes such as a race, a gender, an expression, and a direction (facing the front, facing the front with the mouse opened, facing the front with one eye closed, facing sideways, facing upward, and facing downward) (see FIG. 15). Preparing the various face images as the learning images makes it possible to perform modeling more appropriately and thus to enhance the accuracy of the recognition and estimation processing.

The preliminary learning section 210 firstly performs Annotation on each learning image, that is, sets feature points. The feature points are points showing the position of a feature part of a face image. The feature part includes a plurality of points (such as end points and points acquired by dividing a section between end points by N) on the contour of an eyebrow, an eye, a nasal muscle or nostrils of a human face, and the face. The "plurality of points on the contour" herein referred to are, for example, end points of the contour, or points acquired by dividing a section between end points by N. FIG. 15 (F) illustrates feature points set on the contours of feature parts. For example, 53 feature points are defined on the contours of the eyebrows, the eyes, the nose, and the face. The defined feature points may be manually set by an operator while the learning images are being viewed or may be automatically set by image processing.

By setting the feature points, coordinate information indicating the position of each feature point of each learning image is acquired. In other words, coordinate vectors based on coordinate values of the 53 feature points are acquired for each learning image.

The preliminary learning section 210 subsequently calculates a shape model. Specifically, the coordinate vectors formed by coordinate values of the feature points in each learning image are subjected to a statistical analysis such as the principal component analysis (PCA) or the independent component analysis (ICA) and are resolved into the basis spaces $s_0, s_1, s_2, \ldots$, and a face shape identified by the positions of the feature points is modeled as a shape model s as shown in the following Formula (1):

$$s = s_0 + \sum_{i=1}^{n} p_i s_i \tag{1}$$

Here, among the basis spaces $s_0, s_1, s_2, \ldots$ acquired by resolving the coordinate vectors of the learning images by the principal component analysis or the like, $s_0$ denotes a mean vector (a coordinate vector representing a mean shape) of the shape model s of a face, and $s_i$ denotes a shape vector corresponding to the i-th basis component acquired by the principal component analysis. In the principal component analysis, a predetermined number (n in Formula (1) above) of basis components corresponding to principal components having a high degree of distribution are employed as the shape vectors, the predetermined number being determined in a descending order of the degree of the distribution. The shape vector $s_i$ denotes a basis vector corresponding to the i-th principal component acquired by the principal component analysis and is an orthogonal vector orthogonal to each other. FIG. 3 is a diagram illustrating the mean vector $s_0$ and the shape vectors $s_1, s_2, \ldots$ acquired by performing the principal component analysis on the coordinate vectors of the plurality of learning coordinates.

Figure 4:
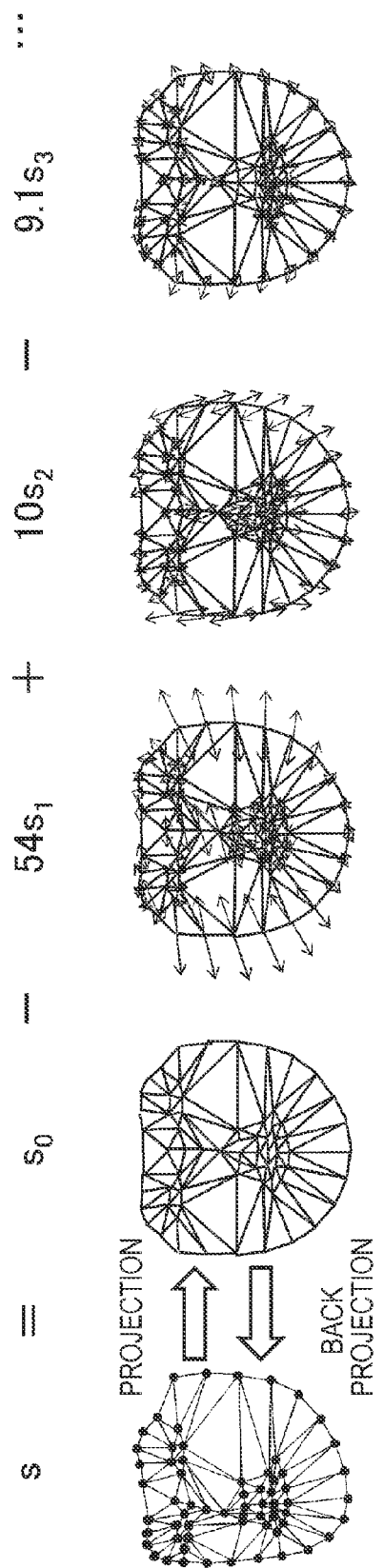
FIG. 4 is a diagram showing how projection and back projection are performed between a shape s and basis spaces.

In addition, in Formula (1) above, $p_i$ denotes a basis coefficient (a shape parameter) representing weighting of the i-th shape vector $s_i$ in building a shape model by combining the mean shape $s_0$ and the shape vectors $s_1, s_2, \ldots$. In sum, the shape model s represents any of various face shapes by combining the mean shape $s_0$ and each shape vector $s_i$ (note that the basis coefficient $p_i$ controls the combination of the basis vector $s_i$). Resolving the inputted shape s into the basis components is referred to as the projection onto the basis spaces. On the contrary, generating the shape s from the basis components is referred to as the back projection. FIG. 4 shows how the projection and the back projection are performed between the shape s of the inputted face image and the basis spaces formed by the mean shape $s_0$ and the shape vectors $s_1, s_2, \ldots$.

The mean shape $s_0$ and each shape vector $s_i$ acquired by the preliminary learning section 210 are stored as the preliminary learning data in the storage section 120, and are used in performing the recognition and estimation processing on the inputted image.

The preliminary learning section 210 subsequently sets a texture model. How to represent the texture model varies depending on the ASM and the AAM.

Figure 5:
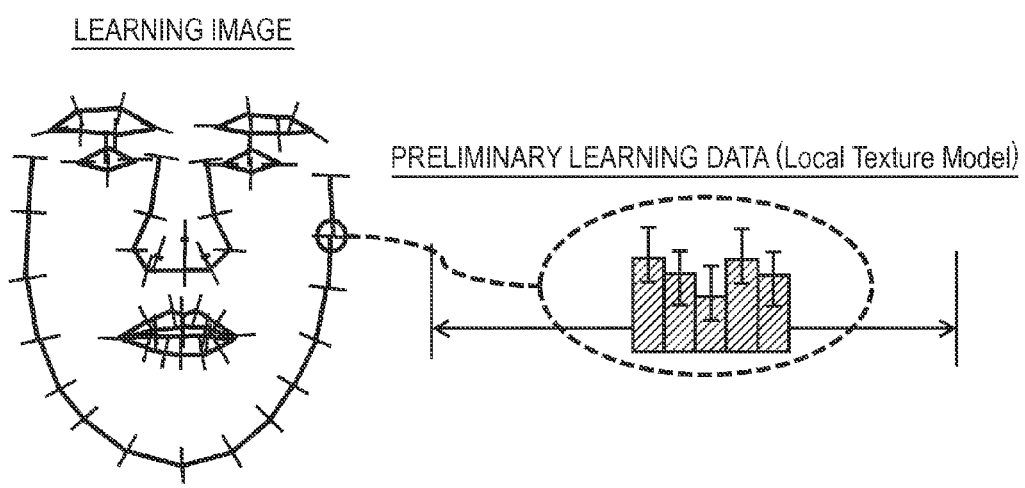
FIG. 5 is a diagram for explaining a texture model (a Local Texture Model) learned in advance.

The ASM uses a local texture model representing local brightness distribution information for each feature point. Specifically, for each feature point set on the contour of a feature part such as an eyebrow, an eye, the nose, the mouse or the face, an average brightness gradient in the normal direction with respect to the contour is learned in advance as the texture model. FIG. 5 shows on the left side thereof normals in feature points set on the contours of feature parts. In addition, FIG. 5 illustrates on the right side thereof a local texture model represented by using the brightness distribution information, in the normal direction, of a certain one of the feature points on the contour of the face. In the example illustrated therein, the texture model is built by using one-dimensional local brightness distribution information of a pixel of the feature point and two pixels on each side of the pixel of the feature point in the normal direction with respect to the contour.

On the other hand, the AAM uses a global texture model. Specifically, brightness value vectors formed by brightness values in each of pixel groups x of the learning images (note that regions other than the mean shape are masked) are subjected to the principal component analysis, and are resolved into a mean face image $A_0(x)$ and a texture vector s $A_i(x)$ resolved as a basis component, and a face texture $A(x)$ is expressed by combining the mean face image $A_0(x)$ and the texture vector $A_i(x)$ (note that the combining with the texture vector $A_i(x)$ is controlled by a coefficient $\lambda_i$), as shown in the following Formula (2):

$$A(x) = A_0(x) + \sum_{i=1}^{m} \lambda_i A_i(x). \tag{2}$$

The texture models learned in advance are stored in the storage section 120 and are used in performing the recognition and estimation processing on an inputted image. Note that a detailed description of a method of calculating a texture model is herein omitted.

In this way, after being acquired as preliminary learning data by the preliminary learning section 210, the texture models are stored in the storage section 120 and used in performing the recognition and estimation processing on the inputted image.

The recognition and estimation processing section 220 performs the recognition and estimation processing for a face image on the inputted image by using the aforementioned preliminary learning data to output a shape of a face image included in the inputted image.

Figure 6:
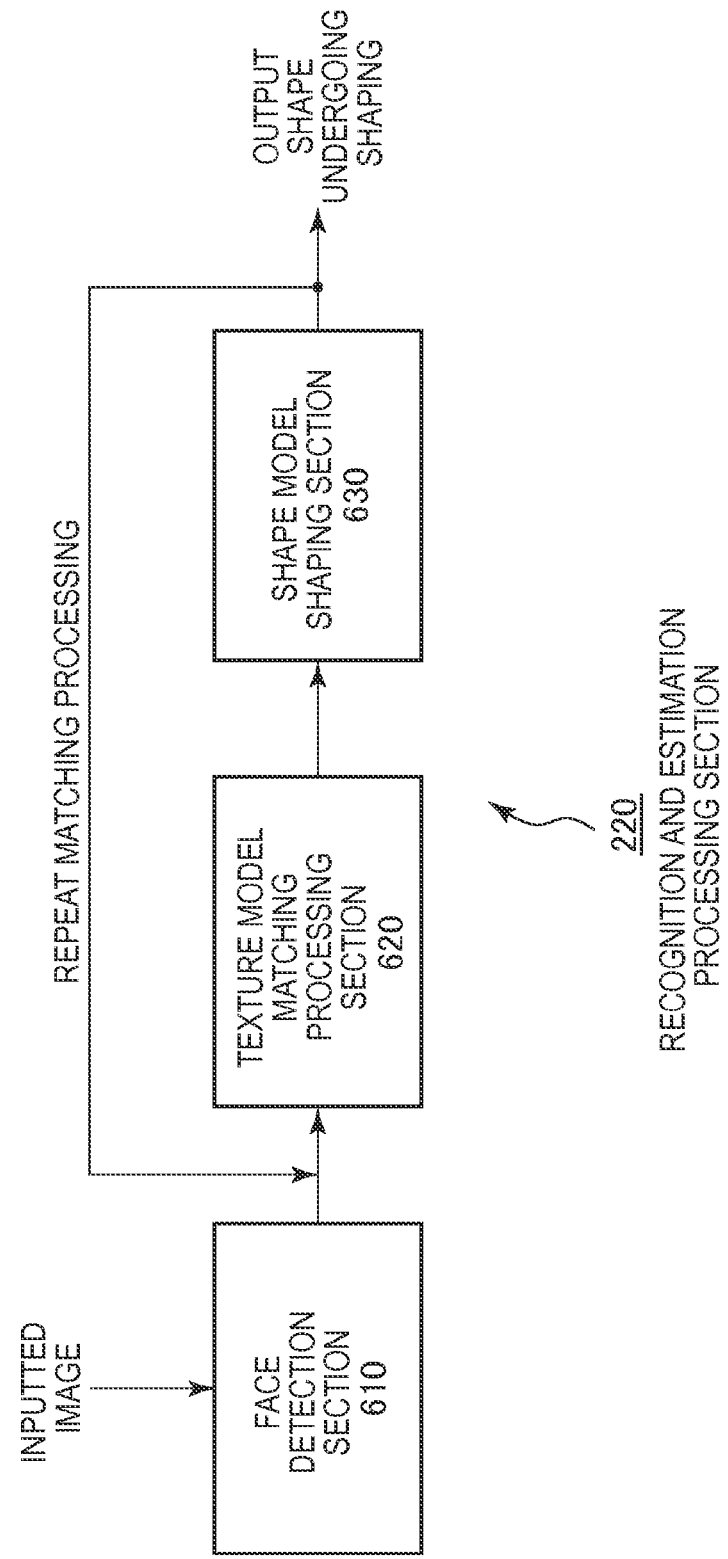
FIG. 6 is a diagram schematically showing a functional configuration of a recognition and estimation processing section 220.

FIG. 6 schematically shows a functional configuration of the recognition and estimation processing section 220. The recognition and estimation processing section 220 illustrated therein includes a face detection section 610, a texture model matching processing section 620, and a shape model shaping section 630.

The face detection section 610 detects a face region including the face image from the inputted image inputted through the image input section 140 or the like and detects the 53 feature points defined in advance from the face region. Since the processing of detecting the face region can be performed in any manner in carrying out the technology disclosed herein, a detailed description thereof is omitted herein.

The texture model matching processing section 620 performs processing of searching for each feature point by matching the detected face region with the texture models learned in advance. Specifically, the texture model matching processing section 620 calculates as a cost a brightness difference or the like between each texture model acquired by the preliminary learning and pixels of the inputted image which are assumed to correspond to the texture model and performs processing of searching for a coordinate position having the lowest cost. Here, the matching processing between the local texture model and the face region is described with reference to FIG. 7.

As has been described, each texture model is formed based on the one-dimensional local brightness distribution information of the corresponding feature point set on the contour of the feature part such as the eyebrow, the eye, the nose, the mouse or the face, the information being of a pixel of the feature point and two pixels on each side, in the normal direction with respect to the contour, of the pixel of the feature point.

Meanwhile, the inputted image inputted in the texture model matching processing section 620 includes brightness values of pixels as texture data. Hence, one-dimensional search is performed only on the brightness gradient in the normal direction of each feature point to detect, as the feature point on the inputted image, a pixel position exhibiting the lowest cost calculated with respect to the brightness gradient learned in advance.

Figure 7:
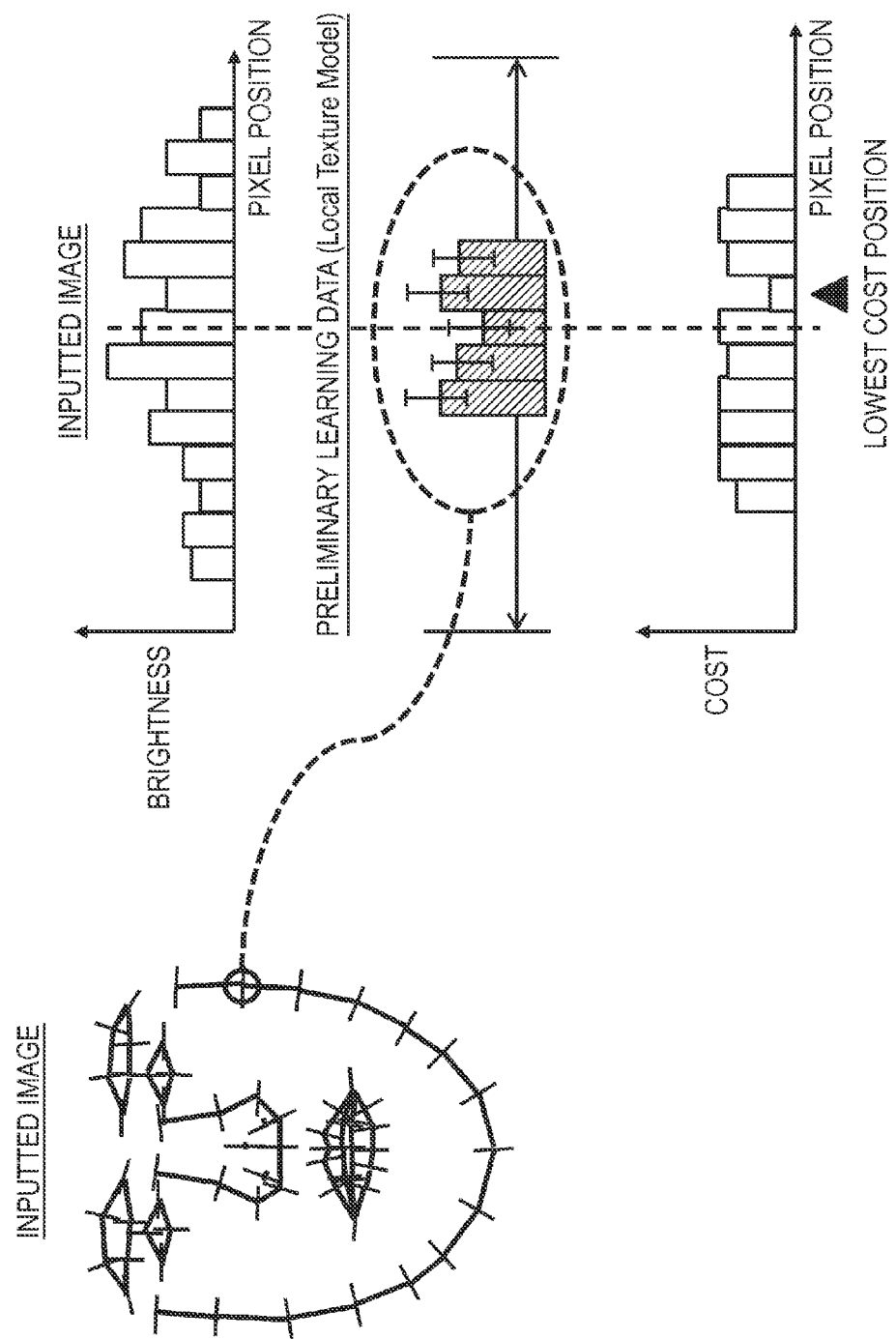
FIG. 7 is a diagram for explaining matching processing performed between a face region and the local texture model.

FIG. 7 shows on the left side thereof normals in the feature points set on the contours of the feature parts. In addition, FIG. 7 illustrates on the right side thereof brightness distribution information, a local texture model, and costs of a certain one of the feature points on the contour of the face on the inputted image. The brightness distribution information is acquired in the normal direction for the feature point. The local texture model is built by using the brightness distribution information of a pixel of the feature point learned in advance and two pixels on each side of the pixel of the feature point. The costs are serially calculated in scanning the texture model in the normal direction on a pixel basis. The position having the lowest cost is a matching pixel, in the feature point.

A cost $f(g_s)$ of the inputted image (the feature point) $g_s$ is expressed as in the following Formula (3), for example:

$$f(g_s) = (g_s - \bar{g})^T S_g^{-1} (g_s - \bar{g}) \tag{3}$$

where $g_s$ represents an input sample, $\bar{g}$ represents a mean brightness gradient, and $S_g$ represents a variance-covariance matrix.

Formula (3) above uses a Mahalanobis distance as a distance indicator. Use of an identity matrix as the variance-covariance matrix $S_g$ leads to a simpler sum of squares distance.

In contrast in the matching processing between the global texture model and the face region, a region surrounded by feature points is divided into sub-regions in a mesh form, and two-dimensional searching is performed to find a region having brightness distribution approximate to that in each sub-region in the mesh, and thereby each feature point is detected. However, any one of the techniques of the ASM or the AAM may be used in carrying out the technology disclosed herein. In other words, the matching processing for the face region may be performed on any one of the local texture model and the global texture model. A detailed description of the latter matching processing is omitted herein.

The shape model shaping section 630 performs the projection and the back projection between the shape s formed by the feature points having undergone the aforementioned matching processing and the basis spaces formed by the mean shape $s_0$ and the shape vectors $s_1, s_2, \ldots$. Then, the shape model shaping section 630 optimizes the basis coefficient, that is, the shape parameter $p_i$ of each shape vector $s_i$ to shape the shape model s.

Thereafter, the execution of the processing by the texture model matching processing section 620 and the shape model shaping section 630 is repeated several times. Thereby, the shape model can be matched with the face image included in the inputted image, and a shape (that is, a face-like shape) close to a shape equivalent to the learning shape, that is, a shaped shape can be acquired.

However, the method such as the ASM/AAM by which a plurality of shape information pieces acquired in advance are resolved into basis spaces, and a certain shape is represented by combining the basis spaces has the following first disadvantage. Specifically, when a part of a shape (feature points) of a target object in an inputted image lies at a position largely deviating from an original position, an entire shape of the object is influenced by the deviation value and is displaced.

Figure 8:
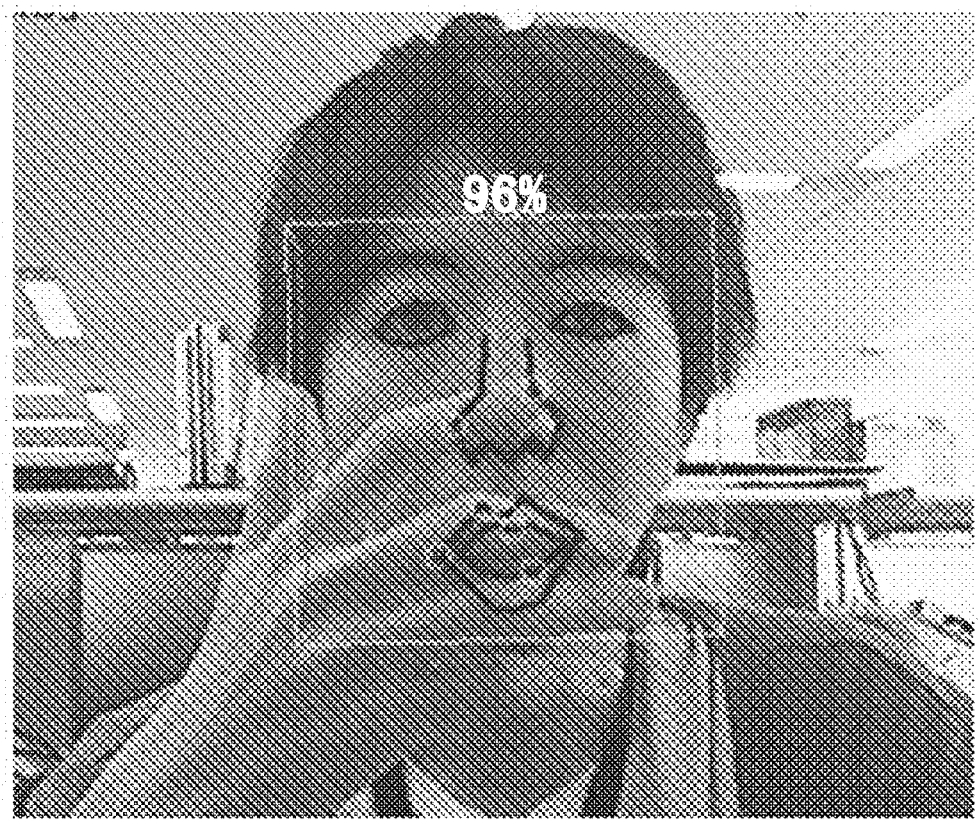
FIG. 8 shows an image illustrating deviation points in an inputted image of a person who is a subject with parts of the face covered with the hand.

As an example of the deviation point herein referred to, a feature point in a region where a target object is partially covered can be taken. FIG. 8 shows circled deviation points in an inputted image of a person who is a subject with parts of the face covered with the hand. If the texture model matching processing section 620 performs the processing without considering a state where several feature points on the contours of the nose and the lips are covered with the hand as illustrated therein, positions largely deviating from the original contours of the nose and the lips are detected as the feature points.

In addition, as another example of the deviation points, feature points in a region beyond a screen frame can be taken. In this case, an image is captured in a state where the region of a part of a target object such as a face is not located within the screen frame. When the texture model matching processing section 620 performs the processing on the feature points which are not present in an inputted image, positions largely deviating from the original positions would be detected as the feature points like in the aforementioned case of covering a part of the face.

Hence, a first disadvantage described above is eliminated in the present embodiment in the following manner. Such feature points that would be the deviation points are detected and masked, so that the shape model shaping section 630 performs the projection onto the basis spaces.

The deviation points are feature points having no information in the inputted image, that is, a target object is covered or partially beyond the screen frame. For this reason, the lowest cost such as a brightness difference to be calculated by the texture model matching processing section 620 is assumed to take on a large value. Accordingly, when the lowest cost calculated for a feature point by the texture model matching processing section 620 in the processing of searching for the coordinate position of each feature point in the inputted image is equal to or higher than a predetermined threshold, the feature point can be judged as a deviation point.

Figure 9:
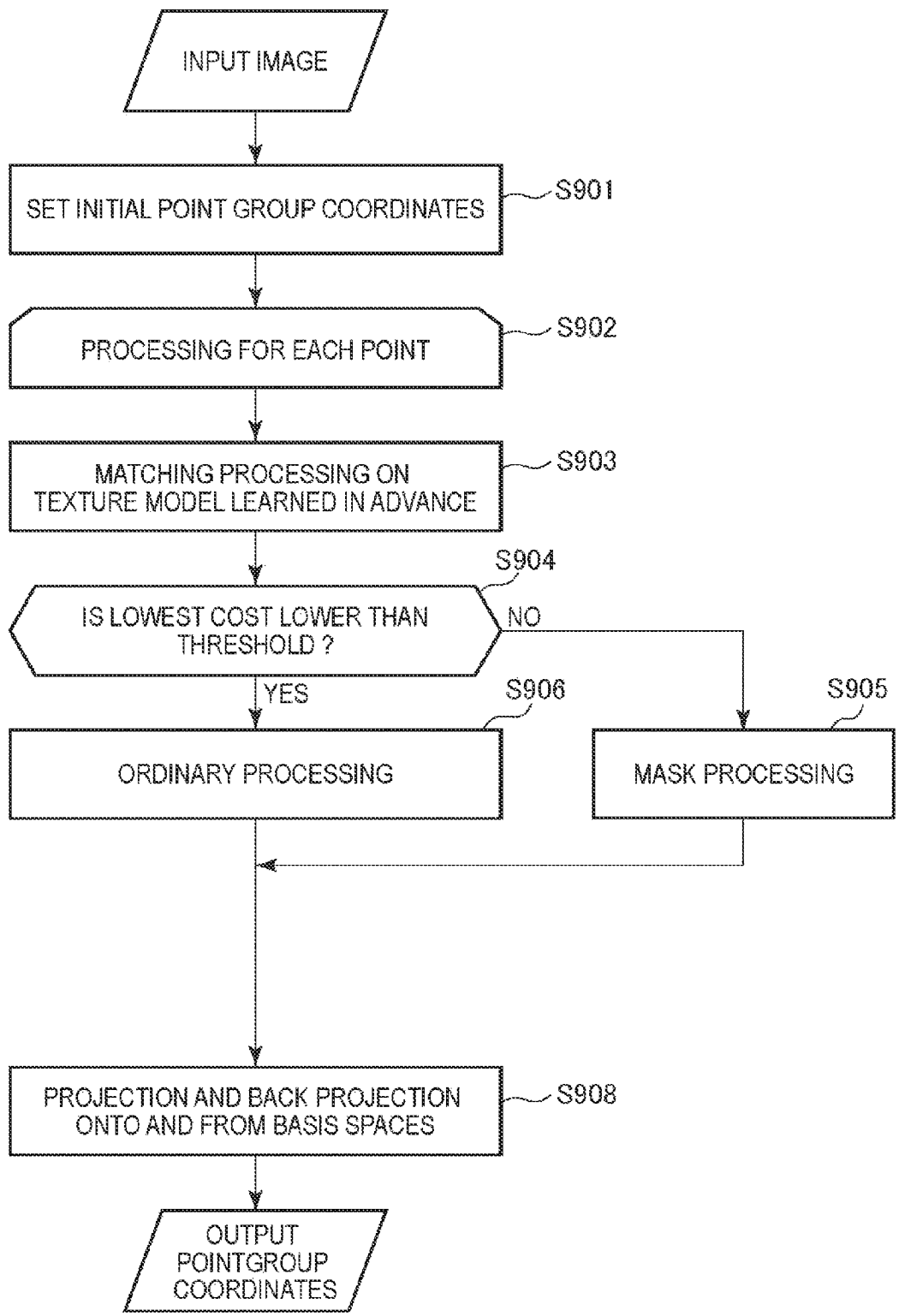
FIG. 9 is a flowchart showing a sequence of recognition and estimation processing including masking the deviation points.

FIG. 9 shows a flowchart of a sequence of the recognition and estimation processing including masking deviation points, the recognition and estimation processing being executed by the recognition and estimation processing section 220.

Firstly, initial point group coordinates are set in an inputted image (Step S901). Specifically, the setting corresponds to arranging a mean face shape $s_0$ in a face region detected from the inputted image by the face detection section 610.

Then, as processing for each feature point (S902 to S906), the texture model matching processing section 620 performs the matching processing between the texture model learned in advance and the feature point set in the inputted image (Step S903). Specifically, for each feature point set in the inputted image, a brightness difference or the like from the texture model acquired in the preliminary learning is calculated as a cost, and the processing of searching for a coordinate position having the lowest cost is performed.

Here, it is judged whether or not the calculated lowest cost is lower than a predetermined threshold (Step S904). Then, if the lowest cost is lower than predetermined threshold (Yes in Step S904), ordinary processing is performed in which the feature point initially set in the inputted image is moved to the coordinate position having the lowest cost (Step S906).

On the other hand, if the lowest cost is equal to or higher than predetermined threshold (No in Step S904), the feature point in the inputted image is judged as a deviation point, and masking processing is performed (Step S905). Specifically, in the masking processing, values of coordinates of the feature point in the inputted image and a corresponding basis component used in the projection are all set to 0 to thereby eliminate the influence of the deviation point which would be exerted in the projection and the calculation of the basis coefficient performed by the shape model shaping section 630 for later processing. If the weighting coefficient is acquired by projecting the inputted image once onto the basis spaces, ordinary back projection performed thereafter results in output of coordinate values close to the original ones even for points masked by the basis components.

Then, after the moving of the lowest cost position or the masking processing by the texture model matching processing section 620 is completed for all of the initial points set in Step S901, the shape model shaping section 630 for the later processing performs the projection of the inputted image onto the basis spaces and the back projection of the basis spaces to optimize the basis coefficient $p_i$ (Step S908). In this way, the recognition and estimation processing section 220 outputs the coordinate values of each feature point of the shape model included in the inputted image.

FIG. 10 shows results of the recognition and estimation processing shown in FIG. 9 performed on inputted images including shapes of the face turned in various directions, changing expressions, and partially covered with the hand. In FIG. 10, estimated face postures are shown by using three-dimensional cubes, and lines are drawn on estimated contours of the nose and the lips. It is found that even though the face is partially covered with the hand, covered feature points are shaped to lie at positions close to the original ones by performing the projection and the back projection by the shape model shaping section 630 after the masking processing, so that a face shape close to the original one as a whole is estimated. In particular, even in the case where the lips are completely covered as shown in FIG. 10 (D), the face shape close to the original one as a whole including the masked feature points can be estimated by processing the other feature points (not masked) of the feature parts such as the eyes and the nose which are not covered.

According to the processing sequence shown in FIG. 9, in addition to the feature points in the covered regions as shown in FIGS. 8 and 10, feature points detected at positions largely deviating from the original positions due to brightness variation factors of a shadow or lighting, feature points in a region beyond the screen frame, and the like are detected as deviation points and masked, and then the projection and the back projection are performed onto the basis spaces of the inputted image. Thus, a shape closed to the original one can be estimated while the influence of the deviation points is eliminated as for the aforementioned feature points in the covered regions.

In addition, the method such as the ASM/AAM by which a plurality of shape information pieces acquired in advance are resolved into basis spaces, and a certain shape is represented by combining the basis spaces has the following second disadvantage. When positions of a shape (feature points) are estimated by using a local feature quantity in an image, it is difficult to locate a region poor in features such as an edge or a texture.

For example, coordinates of the tip of the nose and the like in a face image are poor in not only textures but edges. For this reason, when the texture model matching processing section 620 searches for the tip of the nose alone based on the calculation of the cost such as the brightness difference between the texture model acquired by the preliminary learning and an inputted image, it is difficult to locate the tip of the nose.

Hence, the second disadvantage is eliminated in the present embodiment in the following manner. A feature point, such as the tip of the nose in the face image, which is difficult to locate in searching for the feature point alone is designated as a deviation point and is typically masked. The projection performed after the feature point difficult to locate is typically masked makes it possible to estimate the position of the feature point.

Figure 11:
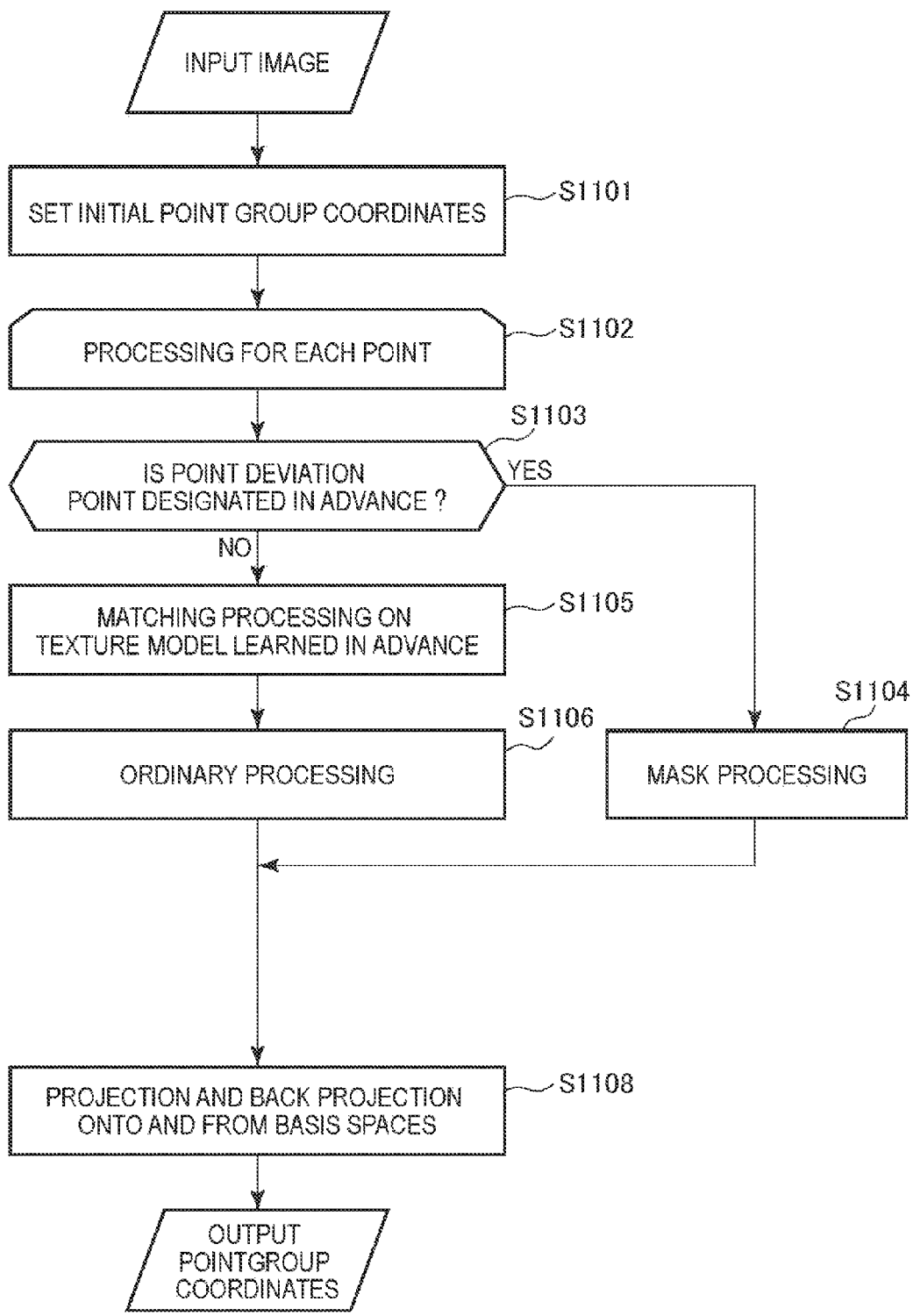
FIG. 11 is a flowchart showing a sequence of the recognition and estimation processing including masking the deviation points designated in advance.

FIG. 11 shows a flowchart of a sequence of the recognition and estimation processing including masking deviation points designated in advance, the recognition and estimation processing being executed by the recognition and estimation processing section 220.

Firstly, initial point group coordinates are set in an inputted image (Step S1101). Specifically, the setting corresponds to arranging a mean face shape $s_0$ in a face region detected from the inputted image by the face detection section 610.

Then, as processing for each feature point (S1102 to S1107), the texture model matching processing section 620 checks whether or not the feature point is a point designated as a deviation point (Step S1103).

Here, for a feature point which is not the feature point designated in advance as a deviation point (No in Step S1103), the texture model matching processing section 620 performs the matching processing with respect to the texture model learned in advance (Step S1105). Specifically, for each feature point set in the inputted image, a brightness difference or the like from the texture model acquired in the preliminary learning is calculated as a cost, and the processing of searching for a coordinate position having the lowest cost is performed. Then, ordinary processing is performed in which the feature point initially set in the inputted image is moved to the coordinate position having the lowest cost (Step S1106).

On the other hand, for the feature point designated in advance as a deviation point (Yes in Step S1103), the masking processing is typically performed (Step S1104). Specifically, in the masking processing, values of coordinates of the feature point in the inputted image and a corresponding basis component used in the projection are all set to 0 to thereby eliminate the influence of the deviation point which would be exerted in the projection and the calculation of the basis coefficient performed by the shape model shaping section 630 for the later processing. If the weighting coefficient is acquired by projecting the inputted image once onto the basis spaces, ordinary back projection performed thereafter results in output of coordinate values close to the original ones even for points masked by the basis components.

Then, after the moving of the lowest cost position or the masking processing by the texture model matching processing section 620 is completed for all of the initial points set in Step S1101, the shape model shaping section 630 for the later processing performs the projection of the inputted image onto the basis spaces and the back projection of the basis spaces to optimize the basis coefficient $p_i$ (Step S1108). In this way, the recognition and estimation processing section 220 outputs the coordinate values of each feature point of the shape model included in the inputted image.

FIG. 12 shows results of the recognition and estimation processing shown in FIG. 11 performed on inputted images including shapes of the face turned in various directions and changing expressions. In FIG. 12, estimated face postures are shown by using three-dimensional cubes, and lines are drawn on estimated contours of the nose and the lips. Generally, it is difficult to locate the tip of the nose poor in edges and textures. However, it is found that a face posture can be appropriately estimated by designating such feature points in advance as the deviation points, by masking the feature points to omit the matching processing on the texture model, and by performing the projection and the back projection on the shape model.

The image processing apparatus 100 corresponds to, for example, a personal computer, a mobile phone, a multifunctional terminal such as a smartphone or a tablet, or a device such as a printer. Although the image processing apparatus 100 can execute all of the recognition and estimation processing for an object shape (a face image) shown in FIG. 9 or FIG. 11, part or all of the processing can be entrusted to an external device such as a server on a network.

Figure 13:
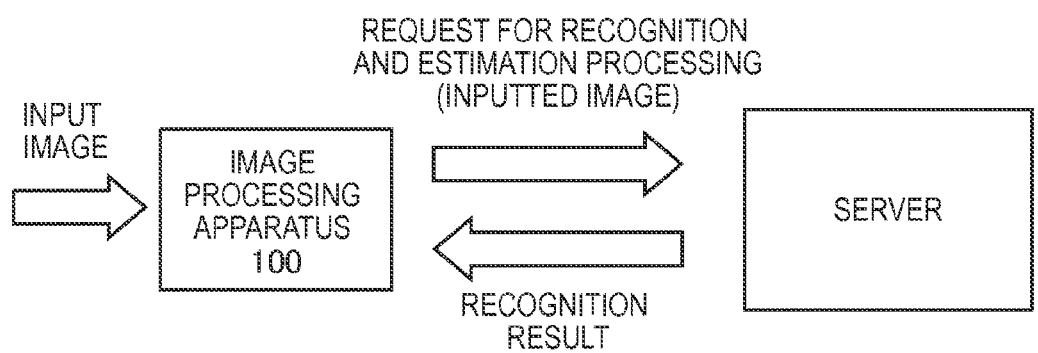
FIG. 13 is a diagram showing a configuration example of a system in which an image processing apparatus 100 performs the recognition and estimation processing on a shape of an object in cooperation with a server.

In the system configuration example shown in FIG. 13, the image processing apparatus 100 is configured to only input an image by using a camera or the like, and requests the server for entire processing of recognizing and estimating an object shape such as a face from the inputted image, and the servers is configured to send back a result of recognizing the shape.

Figure 14:
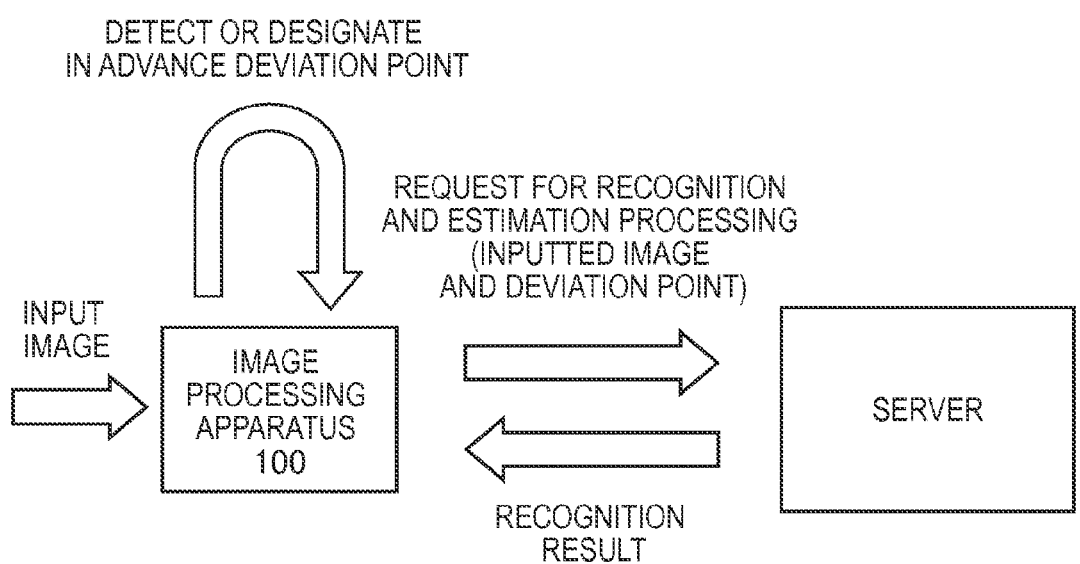
FIG. 14 is a gram showing a configuration example of a system in which the image processing apparatus 100 performs the recognition and estimation processing on a shape of an object in cooperation with the server.

In addition, in the system configuration example shown FIG. 14, the image processing apparatus 100 is configured to input an image by using a camera or the like, to detect deviation points in the inputted image or designate deviation points in advance, and to request the server for the processing of recognizing and estimating an object shape while transmitting the inputted image and information on the deviation points. Alternatively, the image processing apparatus 100 may send the server a shape model of the target object including masked deviation points to request the server for the projection and the back projection between the shape model and the basis spaces. Meanwhile, the server is configured to mask the deviation points to perform the recognition and estimation processing, and to send a result of recognizing the shape back to the image processing apparatus 100.

Additionally, the present technology may also be configured as below.

(1) An image processing apparatus including:

a model information acquisition section which acquires model information in which a plurality of shape information pieces acquired in advance are resolved into basis spaces;

a deviation region detection section which detects a deviation region in a shape of a target object in an inputted image, the deviation region having a difference from the model information; and a projection section which projects the shape of the target object in the inputted image onto the basis spaces after masking the deviation region.

(2) The image processing apparatus according to (1), wherein the basis spaces include a mean shape and basis components of the plurality of shape information pieces acquired in advance, and wherein the deviation region detection section detects a deviation region in the shape of the target object in the inputted image, the deviation region having a difference from the mean shape.

(3) The image processing apparatus according to (1), wherein the model information includes a shape model in which shape information pieces are resolved into basis spaces and a texture model, the shape information pieces being related to coordinate positions of a plurality of feature points defined in the shape of the target object, the texture model being related to texture information of each of the feature points, wherein the image processing apparatus further includes a texture model matching processing section which searches for a position of each feature point in the inputted image based on calculation of a cost which is a difference of the texture information between the inputted image and the texture model, and wherein the deviation region detection section judges, as a deviation point, any of the feature points having a cost equal to or higher than a predetermined threshold, the cost being calculated by the texture model matching processing section.

(4) An image processing apparatus including:

a model information acquisition section which acquires model information in which a plurality of shape information pieces acquired in advance are resolved into basis spaces;

a deviation region detection section which detects a deviation region designated in advance in a shape of a target object in an inputted image; and a projection section which projects the shape of the target object in the inputted image onto the basis spaces after masking the deviation region.

(5) The image processing apparatus according to (4), wherein the model information includes a shape model in which shape information pieces are resolved into basis spaces and a texture model, the shape information pieces being related to coordinate positions of a plurality of feature points defined in the shape of the target object, the texture model being related to texture information of each of the feature points, wherein any of the feature points poor in the texture information is designated in advance as a deviation point.

(6) The image processing apparatus according to (5), further including a texture model matching processing section which searches for a position of each feature point in the inputted image based on calculation of a cost which is a difference between the inputted image and the texture information of the texture model, wherein the texture model matching processing section omits processing for the feature point designated in advance as the deviation point.

(7) The image processing apparatus according to (1) or (4), wherein the model information acquisition section acquires, as the model information, the basis spaces into which the plurality of shape information pieces acquired in advance are resolved by a principal component analysis or an independent component analysis.

(8) An image processing method including:

acquiring model information in which a plurality of shape information pieces acquired in advance are resolved into basis spaces;

detecting a deviation region in a shape of a target object in an inputted image, the deviation region having a difference from the model information; and projecting the shape of the target object in the inputted image onto the basis spaces after masking the deviation region.

(9) An image processing method including:

acquiring model information in which a plurality of shape information pieces acquired in advance are resolved into basis spaces;

detecting a deviation region designated in advance in a shape of a target object in an inputted image; and projecting the shape of the target object in the inputted image onto the basis spaces after masking the deviation region.

(10) An image processing apparatus including:

an image input section which inputs an image including a target object;

a deviation region detection section which detects a deviation region in a shape of the target object in an inputted image, the deviation region having a difference from model information in which a plurality of shape information pieces acquired in advance are resolved into basis spaces;

a processing requesting section which transmits information on the detected deviation region to a server and requests the server for processing of estimating the shape of the target object in the inputted image by projecting the shape onto the basis spaces; and a processing result receiving section which receives a result of estimating the shape of the target object in the inputted image from the server, the result being obtained by projecting the shape onto the basis spaces after masking the deviation region in the shape.

(11) An image processing apparatus including:

an image input section which inputs an image including a target object;

a processing requesting section which transmits information on a deviation region designated in advance to a server and requests the server for processing of estimating a shape of the target object in an inputted image by projecting the shape onto basis spaces into which a plurality of shape information pieces acquired in advance are resolved; and a processing result receiving section which receives a result of estimating the shape of the target object in the inputted image from the server, the result being obtained by projecting the shape onto the basis spaces after masking the deviation region in the shape.

(12) A computer program described in a computer-readable format to cause a computer to function as:

a model information acquisition section which acquires model information in which a plurality of shape information pieces acquired in advance are resolved into basis spaces;

a deviation region detection section which detects a deviation region in a shape of a target object in an inputted image, the deviation region having a difference from the model information; and a projection section which projects the shape of the target object in the inputted image onto the basis spaces after masking the deviation region.

(13) A computer program described in a computer-readable format to cause a computer to function as:

a model information acquisition section which acquires model information in which a plurality of shape information pieces acquired in advance are resolved into basis spaces;

a deviation region detection section which detects a deviation region designated in advance in a shape of a target object in an inputted image; and a projection section which projects the shape of the target object in the inputted image onto the basis spaces after masking the deviation region.

It should be understood by those skilled in the art that various modifications, combinations, sub-combinations and alterations may occur depending on design requirements and other factors insofar as they are within the scope of the appended claims or the equivalents thereof.

Although the embodiment using the ASM/AAM is mainly described herein, the gist of the technology disclosed herein is not limited thereto. The technology disclosed herein is also applicable to various types of image processing technologies in which a plurality of shape information pieces acquired in advance are resolved into basis spaces, and projection and back projection between a certain shape of an object included in an inputted image and the basis spaces are performed.

In addition, although the embodiment in which a face image is recognized and estimated is mainly described herein, the gist of the technology disclosed herein is not limited thereto. The technology disclosed herein is also applicable to processing of recognizing and estimating other various object shapes including a deformed part.

In sum, the technology disclosed herein has been described in an illustrative manner, the content herein should not be understood in a limited manner. The gist of the technology disclosed herein should be understood in consideration of the scope of claims.

The present disclosure contains subject matter related to that disclosed in Japanese Priority Patent Application JP 2012-116366 filed in the Japan Patent Office on May 22, 2012, the entire content of which is hereby incorporated by reference.

What is claimed is:

1. An image processing apparatus comprising:
    a model information acquisition section which acquires model information including a shape model in which a plurality of shape information pieces acquired in advance are resolved into basis spaces and a texture model, the shape information pieces being related to coordinate positions of a plurality of feature points defined in the shape of the target object, the texture model being related to texture information of each of the feature points;
    a textural model matching processing section which searches for a position of each feature point in an inputted image based on calculation of a cost which is a difference of the texture information between the inputted image and the texture model;
    a deviation region detection section which detects a deviation region in a shape of a target object in an inputted image, the deviation region having a difference from the model information; and
    a projection section which projects the shape of the target object in the inputted image onto the basis spaces after masking the deviation region thereby outputting coordinate positions of each feature point,
    wherein the model information acquisition section, the textural model matching processing section, the deviation region detection section, and the projection section are each implemented via at least one processor.

2. The image processing apparatus according to claim 1, wherein the basis spaces include a mean shape and basis components of the plurality of shape information pieces acquired in advance, and
    wherein the deviation region detection section detects a deviation region in the shape of the target object in the inputted image, the deviation region having a difference from the mean shape.

3. The image processing apparatus according to claim 1, wherein the deviation region detection section further judges, as a deviation point, any of the feature points having a cost equal to or higher than a predetermined threshold, the cost being calculated by the texture model matching processing section.

4. The image processing apparatus according to claim 1, wherein the model information acquisition section acquires, as the model information, the basis spaces into which the plurality of shape information pieces acquired in advance are resolved by a principal component analysis or an independent component analysis.

5. An image processing apparatus comprising:
    a model information acquisition section which acquires model information including a shape model in which a plurality of shape information pieces acquired in advance are resolved into basis spaces and a texture model, the shape information pieces being related to coordinate positions of a plurality of feature points defined in the shape of the target object, the texture model being related to texture information of each of the feature points;
    a textural model matching processing section which searches for a position of each feature point in an inputted image based on calculation of a cost which is a difference of the texture information between the inputted image and the texture model;
    a deviation region detection section which detects a deviation region designated in advance in a shape of a target object in an inputted image; and
    a projection section which projects the shape of the target object in the inputted image onto the basis spaces after masking the deviation region thereby outputting coordinate positions of each feature point,
    wherein the model information acquisition section, the textural model matching processing section, the deviation region detection section, and the projection section are each implemented via at least one processor.

6. The image processing apparatus according to claim 5, wherein any of the feature points having texture information that does not satisfy a predetermined threshold is designated in advance as a deviation point.

7. The image processing apparatus according to claim 6, wherein the textural model matching processing section further omits processing for the feature point designated in advance as the deviation point.

8. An image processing method using at least one processor, the method comprising:
    acquiring, by the at least one processor, model information including a shape model in which a plurality of shape information pieces acquired in advance are resolved into basis spaces and a textural model, the shape information pieces being related to coordinate positions of a plurality of feature points defined in the shape of the target object, the texture model being related to texture information of each of the feature points;
    searching for a position of each feature point in an inputted image based on calculation of a cost which is a difference between the inputted image and the texture information of the texture model;
    detecting a deviation region in a shape of a target object in the inputted image, the deviation region having a difference from the model information; and
    projecting the shape of the target object in the inputted image onto the basis spaces after masking the deviation region thereby outputting coordinate positions of each feature point.

9. An image processing method using at least one processor, the method comprising:
    acquiring, by the at least one processor, model information including a shape model in which a plurality of shape information pieces acquired in advance are resolved into basis spaces and a textural mode, the shape information pieces being related to coordinate positions of a plurality of feature points defined in the shape of the target object, the texture model being related to texture information of each of the feature points;

searching for a position of each feature point in an inputted image based on calculation of a cost which is a difference between the inputted image and the texture information of the texture model;

detecting a deviation region designated in advance in a shape of a target object in the inputted image; and projecting the shape of the target object in the inputted image onto the basis spaces after masking the deviation region thereby outputting coordinate positions of each feature point.

10. An image processing apparatus comprising:

an image input section which inputs an image including a target object;

a deviation region detection section which detects a deviation region in a shape and texture of the target object in an inputted image, the deviation region having a difference from model information in which a plurality of shape information pieces acquired in advance are resolved into basis spaces;

a textural model matching processing section which searches for a position of each feature point in an inputted image based on calculation of a cost which is a difference of texture information between the inputted image and the texture model;

a processing requesting section which-transmits information on the detected deviation region to a server and requests the server for processing of estimating the shape of the target object in the inputted image by projecting the shape onto the basis spaces; and a processing result receiving section which receives a result of estimating the shape of the target object in the inputted image from the server, the result being obtained by projecting the shape onto the basis spaces after masking the deviation region in the shape thereby outputting coordinate positions of each feature point, wherein the image input section, the deviation region detection section, the textural model matching processing section, the processing requesting section, and the processing result receiving section are each implemented via at least one processor.

11. An image processing apparatus comprising:

an image input section which inputs an image including a target object;

a processing requesting section which transmits information on a deviation region designated in advance to a server and requests the server for processing of estimating a shape and texture of the target object in an inputted image by projecting the shape onto basis spaces into which a plurality of shape information pieces acquired in advance are resolved;

a textural model matching processing section which searches for a position of each feature point in an inputted image based on calculation of a cost which is a difference of texture information between the inputted image and the texture model, and a processing result receiving section which receives a result of estimating the shape of the target object in the inputted image from the server, the result being obtained by projecting the shape onto the basis spaces after masking the deviation region in the shape thereby outputting coordinate positions of each feature point, wherein the image input section, the processing requesting section, the textural model matching processing section, and the processing result receiving section are each implemented via at least one processor.

12. A non-transitory computer-readable medium having embodied thereon a computer program, which when executed by a processor of a computer causes the processor to execute a method, the method comprising:

acquiring model information including a shape model in which a plurality of shape information pieces acquired in advance are resolved into basis spaces and a textural mode, the shape information pieces being related to coordinate positions of a plurality of feature points defined in the shape of the target object, the texture model being related to texture information of each of the feature points;

searching for a position of each feature point in an inputted image based on calculation of a cost which is a difference between the inputted image and the texture information of the texture model;

detecting a deviation region in a shape of a target object in the inputted image, the deviation region having a difference from the model information; and projecting the shape of the target object in the inputted image onto the basis spaces after masking the deviation region thereby outputting coordinate positions of each feature point.

13. A non-transitory computer-readable medium having embodied thereon a computer program, which when executed by a processor of a computer causes the processor to execute a method, the method comprising:

acquiring model information including a shape model in which a plurality of shape information pieces acquired in advance are resolved into basis spaces and a textural model, the shape information pieces being related to coordinate positions of a plurality of feature points defined in the shape of the target object, the texture model being related to texture information of each of the feature points;

searching for a position of each feature point in an inputted image based on calculation of a cost which is a difference between the inputted image and the texture information of the texture model;

detecting a deviation region designated in advance in a shape of a target object in the inputted image; and projecting the shape of the target object in the inputted image onto the basis spaces after masking the deviation region thereby outputting coordinate positions of each feature point.

* * * * *